Sept. 24, 1968  G. LE ROY  3,402,418
WIPER ASSEMBLY FOR SIGHT GLASS
Filed April 25, 1966  2 Sheets-Sheet 1

INVENTOR
GENE LE ROY
BY Cushman, Darby & Cushman
ATTORNEYS

INVENTOR
GENE LeROY

United States Patent Office 3,402,418
Patented Sept. 24, 1968

3,402,418
WIPER ASSEMBLY FOR SIGHT GLASS
Gene Le Roy, Rte. 1, Box 510, Maplewood Estates,
Scott Depot, W. Va. 25560
Filed Apr. 25, 1966, Ser. No. 544,939
7 Claims. (Cl. 15—250.01)

ABSTRACT OF THE DISCLOSURE

A wiper for cleaning the inner surface of the lens of a sight glass comprising an elongated wiper blade of a flexible material which can bend about an axis perpendicular to the lens surface to form a curved shape. The blade is within a tubular member whose axis is perpendicular to the lens and there is a rod through the tubular member fastened to the middle of the blade. Movement of the rod through the tubular member moves the middle of the blade back and forth across the lens and the flexible blade bends to conform to the tubular member so that the entire inner surface of the lens may be cleaned. The blade may be eccentrically mounted on the end of the rod so that rotation of the rod will cam the blade against the lens for use and away from the lens for storage. Washer means may include a tube through the rod with a nozzle at the tip of the rod or nozzles in the tubular member.

---

The present invention relates to a sight glass for use with enclosed vessels and the like and, more particularly, to means for cleaning the internal surface of the lens in such sight glass.

A sight glass is a device secured over an opening into a vessel which permits inspection of the contents. Generally, it comprises a lens and associated parts which hold the lens against the rim around said opening.

The lens frequently is a laminate comprising one or more layers of tempered glass, used because of the high strength of tempered glass, and a layer of untempered glass at the inside of the lens, such as borosilicate glass which is more resistant to attack by corrosive elements. The inner layer can be coated with another substance for further corrosion resistance, for example a resistant plastic such a polytetrafluoroethylene or polychlorotrifluoroethylene.

In use, the contents of a chemical reactor may form a layer on the internal surface of a sight glass which reduces visibility. This layer can be removed during a shut down, but it often is necessary to remove it while the reactor is in use, and various devices have been used to wash and/or wipe the internal surface. The present invention is concerned with a device for cleaning the internal surfaces of sight glasses and especially sight glasses having circular lenses (lenses which are circular disks having flat inner surfaces). As will be appreciated, the cleaning of such lenses requires a device that can adapt to the circular shape of the lens. Briefly stated, the cleaning device of the present invention comprises a wiper blade and means for moving the wiper blade in contact with the inner surface of the lens. The wiper blade is constructed of a flexible material which can bend about an axis perpendicular to the lens surface to form a curved shape, so as to conform to the arcuate outer edges of the lens. However, the width of the blade in the direction perpendicular to the lens surface is substantially less than its length, so that the bending of the blade about a longitudinal axis parallel to the lens surface is relatively limited. There also is provided a ring or tube below the lens which receives such wiper blade and provides an abutment which causes the blade to bend and thereby clean the circular glass surface when the blade is moved toward the edge of the lens.

The invention also provides a washing mechanism for spraying a liquid onto the lens to loosen the layer of material formed thereon.

Better understanding of the invention is provided by the following detailed description of a preferred embodiment thereof and by reference to the drawings in which.

Figure 1:
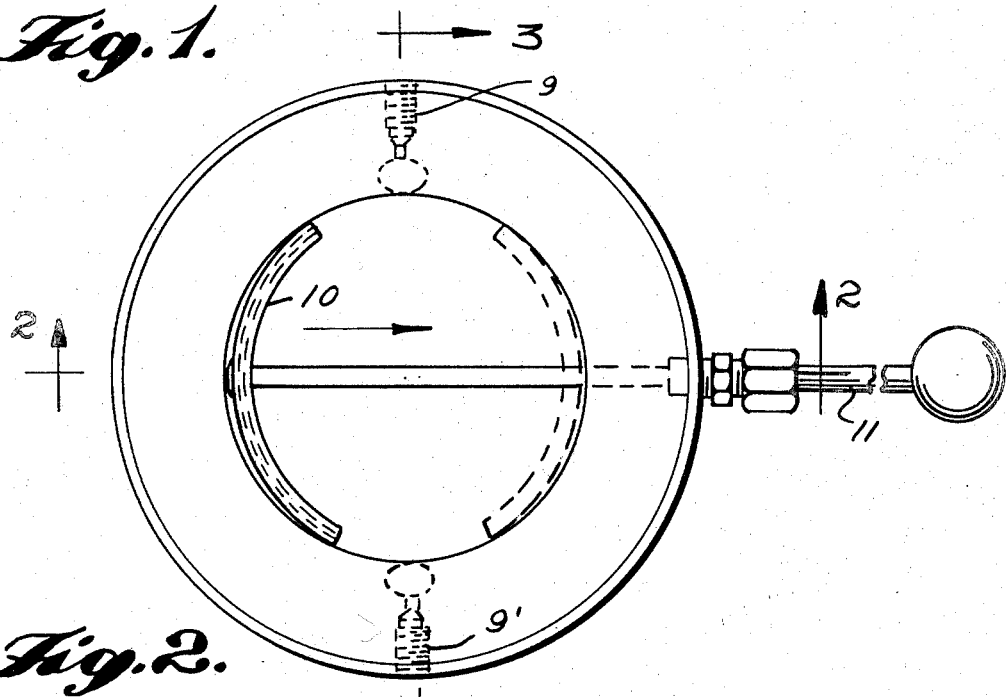
FIGURE 1 is a plan view of a wiper assembly for a sight glass.
Figure 2:
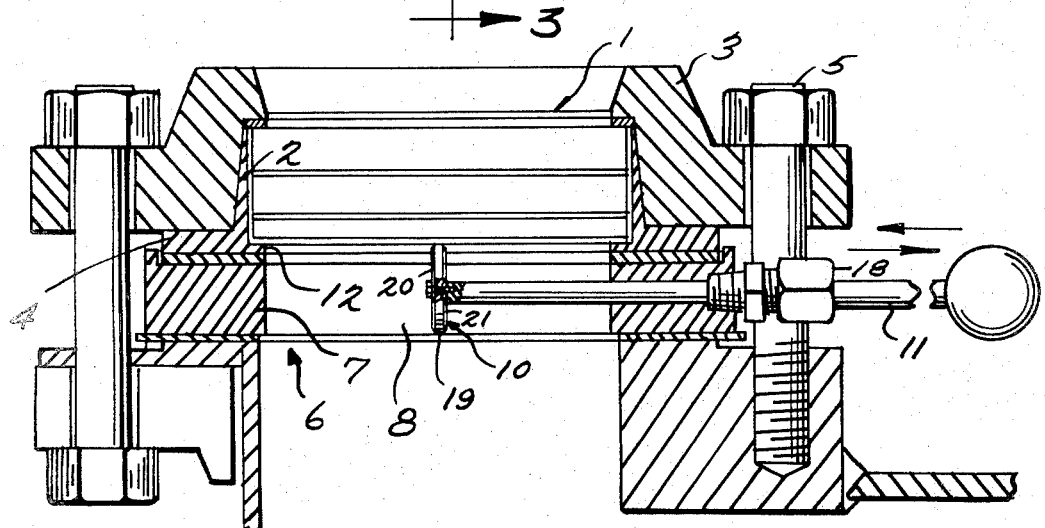
FIGURE 2 is a cross section of a sight glass showing the wiper assembly viewed along lines 2–2 of FIGURE 1.
Figure 3:
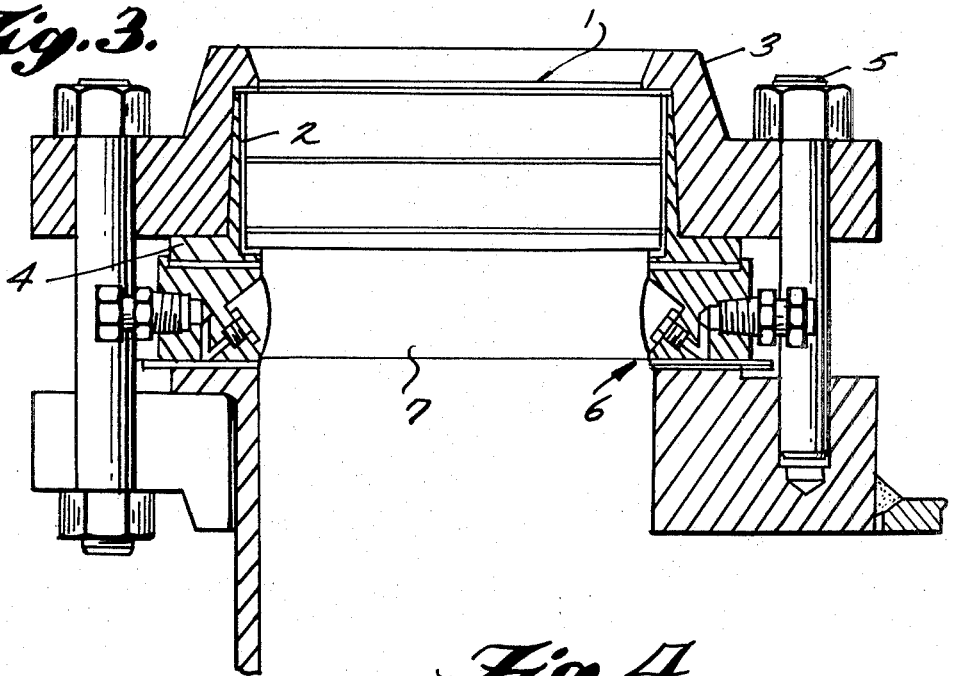
FIGURE 3 is a cross section of a sight glass showing the wiper assembly along lines 3–3 of FIGURE 1.

The sight glass shown in FIGURES 2 and 3 is of the type described and claimed in U.S. Patent 3,148,543. It comprises a lens assembly 1, a ferrule 2 which holds the lens assembly and a compression ring 3. The ferrule 2 has an outwardly extending flange 4 at its base against which the compression ring 3 is seated and the entire assembly is bolted against a vessel by bolts 5 through openings in the compression ring. FIGURES 2 and 3 show two different types of vessel attachment, the left hand attaachment illustrating a flanged connection and the right hand attachment being to a flanged pad.

Between the flange 4 of the ferrule and the vessel there is inserted a wiper assembly indicated generally by the numeral 6. This comprises a ring or tubular member 7 having an internal opening 8 therethrough, liquid inlets 9 and 9', a wiper blade 10 and a push rod 11 for moving the wiper blade, slidably mounted through an opening through the tubular member 7. The ring 7 has an inner diameter about the same as the inner diameter of the ferrule 2. As can be seen in FIGURES 2 and 3, the ferrule has an inwardly projected lip 12 at its base against which the lens assembly 1 is seated, and which therefore defines the exposed area of the inner surface of the lens. The inner diameter of the ring 7 is about the same as the inner diameter of lip 12.

Figure 5:
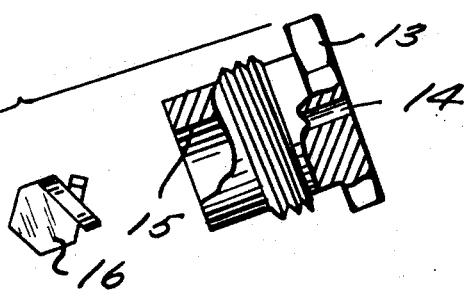
FIGURE 5 is a view partly in cross section showing the two components of the liquid spray nozzle used in the sight glass of FIGURES 1, 2 and 3.

There are two openings 9 and 9' at opposite sides of the ring for liquid injection. As seen in FIGURE 3, each comprises a plurality of interconnected drilled holes, the outer hole being threaded to receive a pressure-type tubing connector and the inner upwardly inclined hole being threaded to receive a spray nozzle. A suitable spray nozzle is illustrated in FIGURE 5 and comprises a bushing 13 having a small diameter outlet opening 14 and a larger diameter inlet opening 15 which receives an insert member 16. As will be appreciated, the insert 16 creates a swirling motion in the liquid and causes the liquid to be sprayed over a wide angle of the inner surface of the lens 1.

Figure 6:
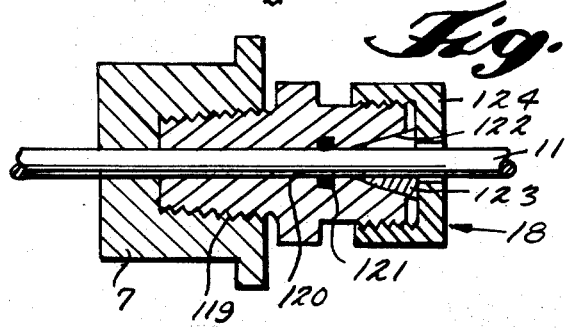
FIGURE 6 is a cross-section of a portion of the wiper assembly showing means for locking the wiper blade in a fixed position.

A third horizontal opening 17 is provided through the tubular member 7, halfway between openings 9 and 9' to receive a push rod 11. The opening may be lubricated to permit smooth sliding and rotation of the rod. There is a fitting 18, having an O ring seal threaded into the outer end of the opening. It forms a pressure-tight connection which may be loosened slightly when the wiper is used. As may be seen in FIG. 6, the fitting 18 is secured by a tapered pipe thread 119 into the opening in ring 7 and has a central bore 120 through which the push rod 11 slides. There is a groove 121 which receives the O ring and which forms a hermetic seal with the rod 11. At the outer end, there is a frusto-conical opening 122 which receives a tapered ferrule 123 which is split lengthwise. A hexagonal cap 124 is threaded to the outer end of the fitting to compress the ferrule into opening 122. This locks the push rod, but permits its easy release when the cap 124 is loosened. When the wiper is not being used, it may be locked at one side of the lens 1.

The wiper blade 10 is secured to the distal end of the push rod 11 by a screw in an off-center opening in the end of the push rod. This eccentric mounting permits rotation of the wiper blade around the push rod so that rotation of the rod 11 during cleaning will compress the blade against the inner surface of the lens assembly 1. The blade contains a flexible material 9 which will not scratch the lens and should itself be relatively corrosion resistant. A particularly suitable material is Teflon felt e.g. a felt material made of Teflon fibers or a felt of other fibers impregnated with Teflon, about 1/16" thick. Thin metal bands 20 and 21 are against the opposite sides of the flexible material 19 to reinforce it, but these too must be flexible and corrosion resistant. A suitable material is type 302 stainless steel about 0.10 inch thick. It will be noted that the steel bands do not extend to the ends of the blade so that the felt material will contact the inernal opening of the tubular member 7 and thereby prevent scratching.

An important feature of the wiper blade is that its length is greater than its width. As a result, it can bend easily to conform to the circular shape of the inside of tubular member 7 but does not bend substantially about the longitudinal axis parallel to the internal surface of the lens. That is, the bending of a thin strip about an axis depends upon the force applied, the modulus of elasticity, the cross sectional area, and the thickness of the strip perpendicular to said axis. Since the cross sectional area along the longitudinal axis is considerably larger than along the transverse axis, the amount of bending of the blade when the push rod 11 is moved is considerable along the length of the blade but only slight across its width.

For this advantage to be obtained, it is desirable that the blade be at least twice as long as it is wide, and preferably the length is about three times the width. The blade should be sufficiently thin to bend to conform to the circular shape of the internal opening 8. However, the exact thickness of the blade will depend on the nature of the material used, but can readily be determined by simple experimentation.

Figure 4:
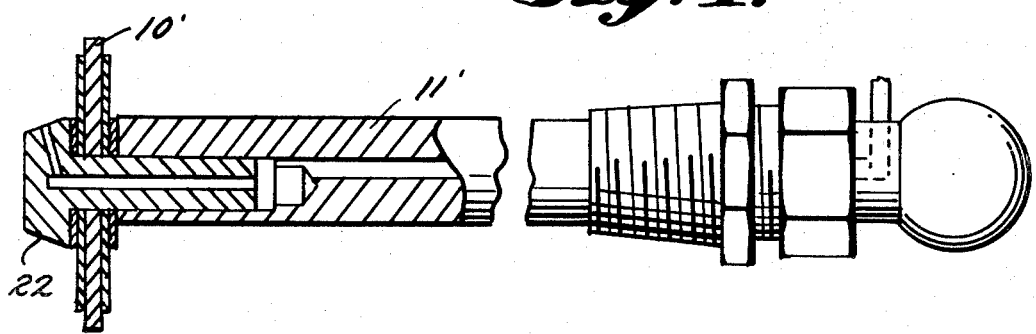
FIGURE 4 is a cross section of another embodiment of wiper blade, some parts being shown in elevation.

FIGURE 4 illustrates a modified form of wiper assembly in which the rod 11' is hollow and the blade 10' is fastened to it by a nozzle 22 press fitted into an off-center opening 23 at the end of the rod.

The nozzle is directed toward the inner surface of the lens and sprays liquid as the blade moves across the lens.

The assembly 6 is mounted between the ferrule 2 and the vessel and gaskets are placed above and below it. In use, the push rod 11 is moved back and forth across the lens and the wiper blade bends to contact substantially all of the exposed surface of the lens. If the length of the wiper blade 10 is approximately the same as the internal diameter of the tubular member 7, the ends of the blade do not move substantially except to slide along the inside of the tubular member. As they move, the blade bends until it abuts against the tubular member, thereby scraping against the inner surface of the lens. This cleans substantially all of the exposed surface. In contrast, a stiff blade would cover only a rectangular or square area, at most about three-fourths of the area of the lens.

It therefore will be appreciated that the apparatus described achieves the objects of the invention. It will be understood that various changes may be made in details of construction and mode of operation without departing from the scope of the invention, since the foregoing description of a preferred embodiment was intended only for purposes of illustration, the scope of the invention being defined by the appended claims.

I claim:
1. A wiper assembly for cleaning the inner surface of a sight glass having a round lens, said wiper assembly comprising a tubular member having an internal opening and adapted to be attached adjacent to said lens, a thin flexible elongated wiper blade within said tubular member and a rod slidably mounted through an opening through the wall of said tubular member for slidable movement in a path perpendicular to said wiper blade and secured to said wiper blade intermediate its ends, said rod moving the long edge of said wiper blade across said tubular member to remove material from the inner surface of said lens, the length of said blade across said tubular member being substantially greater than its width so that it can bend to conform to the inner walls of said tubular member and thereby clean substantially all of said lens without bending excessively about a longitudinal axis parallel to said lens.

2. A wiper assembly as set forth in claim 1 in which said lens and said internal opening are circular.

3. A wiper assembly as set forth in claim 1 in which said means for moving comprises a rod slidably mounted in an opening through the wall of said tubular member and secured to the middle of said blade.

4. A wiper assembly as set forth in claim 1 in which said blade is rotatably mounted on the end of said rod at a point remote from the center of said rod so that rotation of said rod about its axis moves said blade toward and away from said lens to increase and decrease the pressure between the blade and the lens.

5. A wiper assembly as set forth in claim 1 in which the long edge of said blade extends approximately across said internal opening.

6. A wiper assembly as set forth in claim 1 in which there is at least one opening through said tubular member for injection of liquid against said lens to loosen accumulated material on said lens.

7. A sight glass for inspection of the contents of a vessel comprising a lens, means for securing said lens to a vessel adjacent an opening therethrough, and a wiper ring assembly, said assembly comprising a tubular member attached to said securing means having an internal opening adjacent the inner surface of said lens, a thin flexible elongated wiper blade within said tubular member and a rod member slidably mounted through an opening through the wall of said tubular member for slidable movement in a path perpendicular to said wiper blade and secured to said wiper blade intermediate its ends, said rod moving the long edge of said wiper blade across said tubular member and in contact with the inner surface of said lens, the length of said blade across said tubular member being substantially greater than its width so that it can bend to conform to the inner walls of said tubular member and thereby clean substantially all of said lens without bending excessively about a longitudinal axis parallel to said lens.

References Cited
UNITED STATES PATENTS

| | | | |
|---|---|---|---|
| 1,234,191 | 7/1917 | Mahaley | 73—324 |
| 1,252,656 | 1/1918 | Breen | 73—324 |
| 1,487,175 | 3/1924 | Mitzenmacher et al. | |
| 2,206,006 | 6/1940 | Hendrey | 73—324 |
| 2,680,874 | 6/1954 | Mitchell | 73—324 XR |
| 3,089,338 | 5/1963 | Glasgow | 73—324 |

WALTER A. SCHEEL, *Primary Examiner.*
R. SMITH, *Assistant Examiner.*